United States Patent [19]

Gloton

[11] Patent Number: 5,635,701

[45] Date of Patent: Jun. 3, 1997

[54] PORTABLE DEVICE FOR THE FUNCTIONAL LINKING OF A CHIP CARD WITH A CENTRAL PROCESSING UNIT

[75] Inventor: Jean-Pierre Gloton, La Ciotat, France

[73] Assignee: Gemplus Card International

[21] Appl. No.: 400,238

[22] Filed: Mar. 3, 1995

[30] Foreign Application Priority Data

Mar. 4, 1994 [FR] France ................... 94 02530

[51] Int. Cl.⁶ ........................................... G06K 7/00
[52] U.S. Cl. ........................................... 235/486
[58] Field of Search ........................ 235/492, 441, 235/380, 486, 379; 340/825.31, 825.13

[56] References Cited

U.S. PATENT DOCUMENTS

| | | | |
|---|---|---|---|
| 4,942,534 | 7/1990 | Yokoyama et al. | 364/468 |
| 5,471,203 | 11/1995 | Sasaki et al. | 340/825.31 |

FOREIGN PATENT DOCUMENTS

| | | | |
|---|---|---|---|
| 0202622 | 11/1986 | European Pat. Off. | 235/380 |
| 0533542 | 3/1993 | European Pat. Off. | 235/486 |
| 3194680 | 8/1991 | Japan | 235/486 |
| 3282990 | 12/1991 | Japan | 235/486 |
| 4018690 | 1/1992 | Japan | 235/486 |
| 4205079 | 7/1992 | Japan | 235/486 |
| 4360296 | 12/1992 | Japan | 235/486 |
| 5242307 | 9/1993 | Japan | 235/486 |
| 9004239 | 4/1990 | WIPO | 235/380 |

*Primary Examiner*—Donald T. Hajec
*Assistant Examiner*—Thien M. Lee
*Attorney, Agent, or Firm*—Nilles & Nilles, S.C.

[57] ABSTRACT

Portable chip-card readers enabling a remote link to be set up with a central processing unit. It consists in providing, in a pack, for at least two different types, radiofrequency or infrared for example, of communication with the central processing unit. These communications means are selected from the chip card or for detecting signals of the central processing unit, or from both together. An activation circuit is used, if necessary, to activate the reader only on the detection of these signals. It enables the use of a signal reader for different applications, such as permission for entry or the payment of highway toll fees.

16 Claims, 1 Drawing Sheet

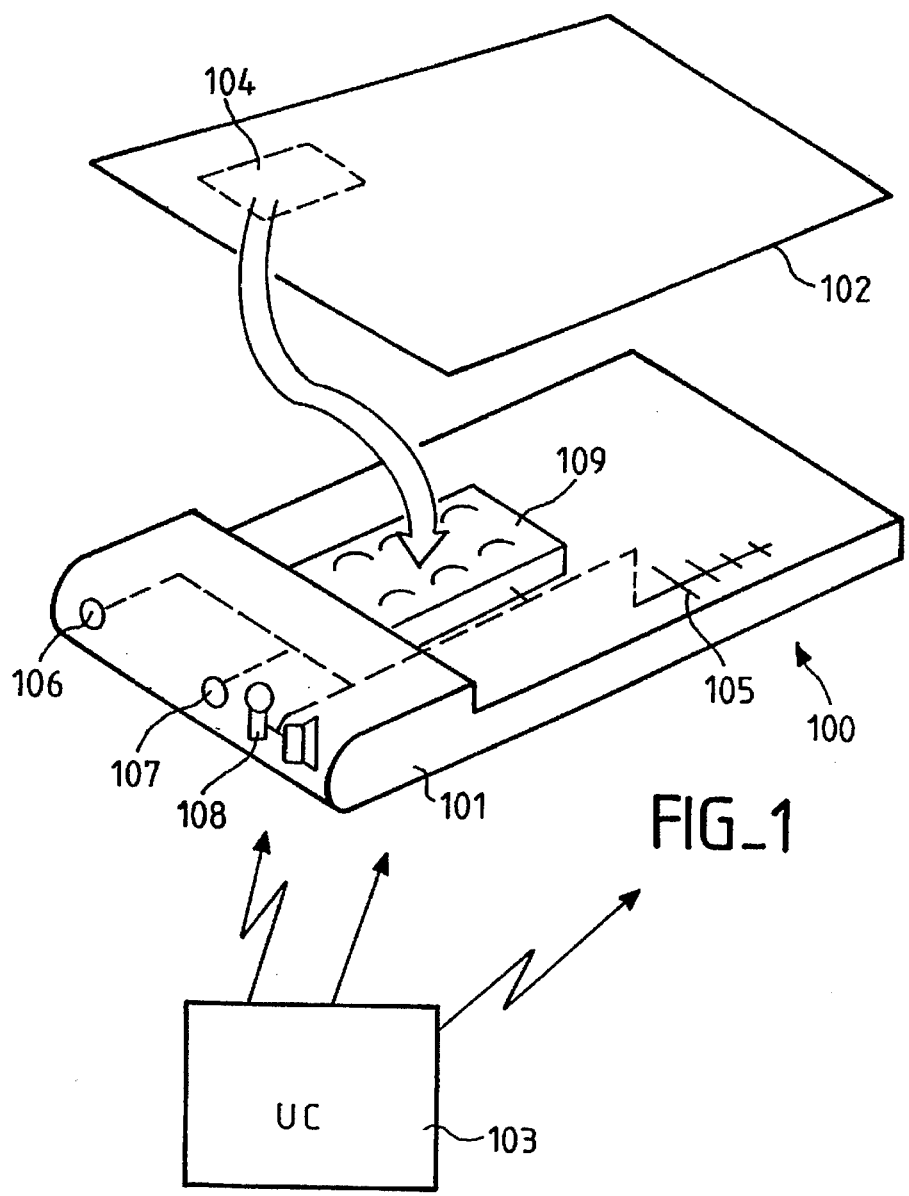
FIG_1
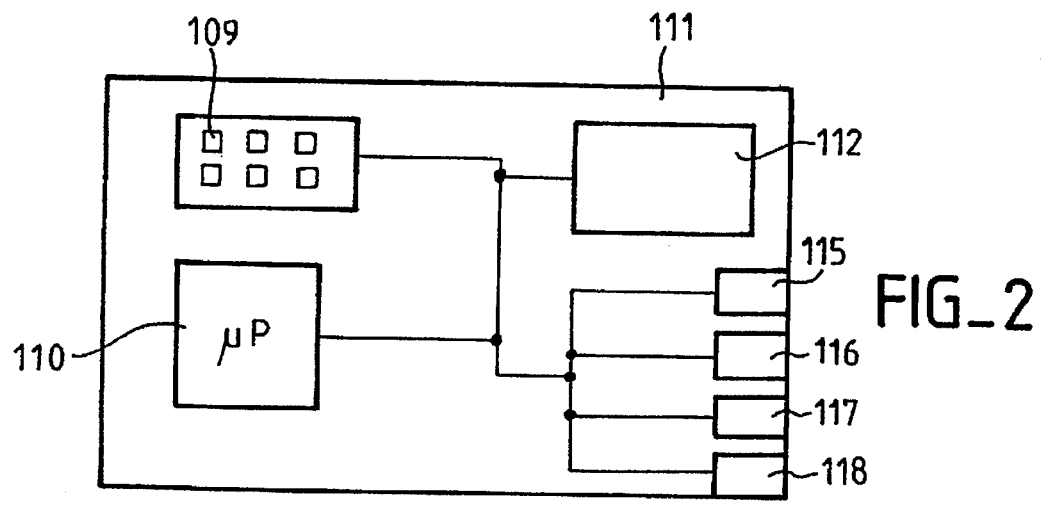
FIG_2

PORTABLE DEVICE FOR THE FUNCTIONAL LINKING OF A CHIP CARD WITH A CENTRAL PROCESSING UNIT

BACKGROUND OF THE INVENTION

1. Field of the Invention

The invention relates to portable readers that enable a link to be set up between a so-called "chip" card or "smart" card and a fixed central processing unit, notably to carry out transactions such as payments, for example.

2. Description of the Prior Art

Chip cards that enable payment transactions to be made directly, in terms of either money or accounting units such as telephone units for example are well known. They comprise a chip fixed into a plastic card having standardized dimensions and provided with a connector which is itself standardized and makes it possible, by means of an electrical connection, to set up the required links with a central processing unit of a reader, said card enabling, for example, the validating of a payment or the setting up of a telephone call.

There also exist known cards that have a number of electronic circuits, including at least one chip, and make it possible, by means of an inductive or radioelectric link, to set up a communication, in order for example to activate the opening of an entry control gate in a place under surveillance as the offices of a firm or to permit payment for services, for example the payment of a toll fee on a highway. These cards generally have the same size as common chip cards but are thicker so as to be capable of housing all the necessary circuits, and they do not have any connector since the link is done without contact.

Finally, there are known cordless telephone sets that are used in cellular radiophone systems and are themselves general-purpose devices. The customizing of these telephone sets, to prevent theft and fraud, is often done by means of a chip card, generally a standard type card, used to send the telephone set the codes needed for its operation and for the identification of the user.

Several trials are currently being made to extend the use of chip cards to a large number of uses, especially in a large number of situations that require the payment of a fee of some kind, such as toll systems, parking, entry into sports centers, etc. In view of the different conditions of use and the particular requirements of the debiting parties, this leads to increasing the number of cards. Thus, a private individual may have to carry at least five cards: a bank card, a phone card, a card to enter the workplace, a highway toll-gate card, and a cellular phone card. If he or she has to visit several establishments for his or her work and use different highway systems, the number of cards to be carried will greatly increase. This will soon become cumbersome and ultimately make people nostalgic about cash.

Various attempts are being made to cope with this increase in the number of specific cards, some of which are known as "electronic wallets". However, the approaches envisaged up to now resolve this problem of proliferation only partially. Above all, there remains the problem of using several different types of links for it would appear to be almost impossible to reduce these different links to only one type, given the different applications that give rise to particular constraints. A single card adapted to all these types of links would in principle be extremely bulky. This, apart form the inconvenience caused, would prevent its use in most of the presently used chip card readers.

SUMMARY OF THE INVENTION

To resolve this problem, the invention proposes a portable device for the functional linking of a chip card with a central processing unit, of the type comprising a pack designed to receive the chip card, means to enable this pack firstly to communicate with the chip card and secondly to set up a link between the pack and the central processing unit to place the chip of the card in a functional link with the central processing unit, wherein chiefly said device comprises:

linking means between the pack and the central processing unit belonging to at least two different types of techniques;

detection means to recognize the technical type of link enabling the pack and the central processing unit to be made to communicate as a function of the application contained in the chip card, these detection means being adapted to carry out the reading, in the chip of the card, of an information element determining the technical type of link to be used; and selection means to select the linking means corresponding to the technical type thus detected.

According to another characteristic, the detection means enable the detection of the signals sent out by the central processing unit to determine the technical type of link to be used, in view of the information elements corresponding to this type of technique that are possibly contained in the chip of the card.

According to another characteristic, the selection means enable the commanding of the deactivation of the pack in order to limits its power consumption and the detection means enable the activation of the selection means to put the pack back into operation upon the detection of the signal coming from the central processing unit.

According to another characteristic, the device includes at least one control unit enabling the manual selection of the type of link to be used.

According to another characteristic, the selection means enable the detection of the presence of the chip card in the pack in order to permit the working of the pack only if this chip card is present.

BRIEF DESCRIPTION OF THE DRAWING

Other particular features and advantages of the invention shall appear more clearly from the following description, given by way of a non-restrictive example with reference to the appended figures, of which:

FIG. 1 shows a schematic view in perspective of a reader according to the invention, accompanied by a chip card designed to be placed in this reader and a central processing unit designed to be connected to it; and FIG. 2 shows a simplified electronic diagram of the circuits of the reader of FIG. 1.

MORE DETAILED DESCRIPTION

The device 100 according to the invention, shown in FIG. 1, comprises a pack 101 capable of taking a chip card 102 and communicating with a central processing unit 103.

This central processing unit 103 is of any standard type, enabling the reception of messages and their transmission in order to set up communication with the pack 101 so as to obtain the desired action. The action may be of a wide variety of types, for example the opening of a gate in the case of a checks on entry, the checking of the passage of a vehicle in the case of a highway toll-gate or the debiting of an account, for example in order to enter a sports center.

The different types of permission, control codes, debit memories, etc. are contained in the chip 104 placed in the card 102. As the case may be, this card may be dedicated to only one application or to several of them.

As is well known and for different reasons either related to the physical requirements of the application or purely for the designer's convenience, the central processing unit 103 has means of communication with the pack 101 which may be of various types. These are, for example, radioelectric links, links by sound or ultrasound acoustic waves and infrared optical links. The pack may even be electrically connected to the central processing unit 103 by galvanic connections.

In order to enable the use of a single linking pack 101 with an entire variety of central processing units 103, the invention proposes to provide this pack with at least two different means of physical connection with the central processing unit. In the example shown, the pack 101 is provided with a radiofrequency transmission/reception antenna 105, a transmitter-and-receiver infrared diode 106 (possibly a separate transmitter diode and receiver diode), a piezoelectric quartz crystal 107 capable of transmitting and receiving ultrasound and a microphone-plus-loudspeaker unit 108 capable of sending and receiving voice-frequency acoustic waves.

The pack may thus physically communicate with at least four types of central processing units 103 by radioelectric, infrared, ultrasonic and voice-frequency acoustic links.

The card 102 gets placed in an appropriate housing of the pack where it is held by appropriate means such as a recess provided with a spring so that the connector of the chip 104 gets coupled with a connector 109 forming part of the pack 101 and connected to means for adaptation with the different linking units 105 to 108.

The pack 101 contains all the means needed to obtain the operation of the different linking units 105 to 108 as well as the means for the selection of these units connected to the connector 106, which work in conjunction with the information elements coming from the chip 104.

The organization of the circuits contained inside the pack 101 is shown schematically in FIG. 2, in which all these circuits are contained in a block 111.

The connector 109 is connected to a microprocessor 110 that enables the management of all the elements of the pack by means of an appropriate program that enables the logical implementation of different functions described in this text. The connector and the microprocessor are joined together by bus-type links with a detection circuit 112 and to linking circuits 115 to 118.

The linking circuits 115 to 118 comprise both linking means 105 to 108 and the adaptation units, known per se, enabling the generation of the supply signals for these units 105 to 108 from the logic transmission signals received from the microprocessor as well as the processing of the reception signals from these units to deliver logic reception signals intended for the microprocessor.

The signals sent and received by the microprocessor correspond to those that are needed to set up the link with the central processing unit 103 according to the logic sequences prescribed and that are prepared and processed in the microprocessor 110 as well as in the chip 104 according to the standards defined for the particular applications to be managed. In the simplest case, the entire intelligence of the application will be contained in the chip 104 and the microprocessor 110 will limit its operations to managing the linking circuits 115 to 118 according to the indications given by the chip 104.

The selection between the separate links, of which there are four here, is done under the control of the microprocessor 110 which sends appropriate commands on the linking bus, these commands being interpreted by the link that has to be activated.

This selection may be done in different ways.

The simplest way is to provide for one chip card per type of central processing unit and to make provision, in the memory of the chip of the card, for the indications of the type of link to be used. These indications will be decoded by the microprocessor 110 when the connection is set up between the connector of the chip and the connector 109 of the pack. The microprocessor will then select that one of the links which corresponds to the application contained in the chip. This decoding therefore constitutes the detection. Another type of selection is purely electromechanical. For example, the card will have a bossing or cavity which, put into a state of correspondence with an electromechanical relay of the pack, selects one particular type of link at the very time when the card is placed in the pack.

Another type of selection consists again in using a detection circuit 112 that makes it possible to determine the type of link and to send the microprocessor 110 a signal indicating the results of this detection. This detection circuit may include, for example, units internal to the pack capable of reacting directly to the signals sent out by the central processing unit, for example an electromagnetic field detection loop.

Under these conditions, the detection circuit could then be used as an activation circuit enabling the entire pack to be put into operation. This circuit itself would work with a very low level of power to avoid draining the supply source of the pack. This circuit may also be connected by direct links, not shown, to the different units 106 to 108 so as to receive, from them, the signals coming from the central processing unit to which the pack has to be connected. These signals, by actuating the reception unit to which they are adapted, then indicate the type of link to be used.

In this particular promising case, the microprocessor 110, which is activated by the activation of the pack under the effect of the detection circuit 112, could thus, in a first stage, determine the type of link to be used and send the chip card a signal indicating the nature of this link. If the chip card then in place in the pack is not adapted to this type of link, then no transaction will be possible. It is possible, in its case, to provide for a warning means, a vibrating device or a light-emitting diode for example, that will be contained in the pack and activated by the microprocessor when this incompatibility is detected, to enable the bearer of the pack to be warned. In this case, the detection circuit is a double detection circuit inasmuch as it seeks to know if a type of link is acceptable both by the central processing unit and the chip card.

If the chip card has an application compatible with the type of link thus determined, then the link will be activated in being first of all selected if it forms part of several distinct applications dedicated to distinct types of link.

The physical link with the central processing unit will then be possible, and subsequent exchanges of signals will then enable communication to be set up between the chip card and the central processing unit to be set up, if this is possible, depending on the compatibility of the applications of the card and of the central processing unit and provided that the process of recognition related to protection systems, if any, goes through properly.

Taking the example of a link between fax machines, the first level of recognition will correspond to the establishment of the telephone link, the second level to the exchange of the characteristic carriers of the fax machines, and the subsequent levels to the exchange of the protocols enabling the definition of the groups, the transmission speeds, etc. The invention therefore corresponds here to the possibility of automatically setting up the appropriate physical link, and the selection of the other levels is known per se.

Apart from these two ways of recognizing the type of link that the pack must take into account, namely the enforcing of the configuration by the card itself and the automatic detection on the basis of the signals received from the central processing unit, possibly in the context of an activation function, the invention also proposes providing the pack with at least one key, not shown in the figure, of a mechanical or touch-sensitive type for example, enabling an operator to give the pack an indication, by hand, of the type of link to be used. Advantageously, activating this key will make it possible to launch the operation of the pack, thus carrying out the activation function. This will makes it possible to economize on the power source. This method will notably have the advantage of providing an acceleration of the implementation of the link. Indeed, the direct detection of the signals received from the central processing unit is not always very fast or even very sure and, in this case, the microprocessor 110 has to be programmed in such a way that it scans the different possibilities of links in carrying out, on each occasion, a possibly relatively lengthy test on the existence or non-existence of signals coming from the central processing unit, in response as the case may be to signals sent out by the pack itself. In thus pressing the button that corresponds to the function that he wishes to use, the user directly launches the procedure of the exchange of signals with the central processing unit in the vicinity of which he is placed.

When the transaction is finished, the microprocessor 110 detects the end of this transaction and may then order the deactivation of the pack, except for the detection circuit 112 of course, until the next detection of a request for a transaction. This deactivation may be done with a variable time lag designed to prevent untimely cuts in links.

Furthermore, the microprocessor 110 may also be programmed to permit the working of the pack only when the chip card 102 is positioned in this pack. This detection can be done in different ways, for example by means of a switch actuated mechanically during the positioning of the chip card or else by electrical detection at the level of the supply contacts of the chip 104.

What is claimed is:

1. A portable device for functionally linking a chip card with a central processing unit, the portable device comprising:

a pack adapted for receiving the chip card;

a first wireless linking device disposed between the pack and the central processing unit, the first wireless linking device being adapted for establishing a first type of wireless communication link with the central processing unit, the first type of wireless communication link corresponding to a first application stored in the chip card;

a second wireless linking device disposed between the pack and the central processing unit, the second wireless linking device being adapted for establishing a second type of wireless communication link with the central processing unit, the second type of wireless communication link corresponding to a second application and being of a different type than the first wireless communication link;

a detector which detects the type of wireless link which enables the chip card and the central processing unit to communicate, the detection being a function of the application contained in the chip card, and the detection device being adapted to carry out a reading of an information element determining the type of wireless link to be used; and a selector which selects one of the first and second wireless linking devices based on the type of wireless link detected, the selection thereby being a function of the application in the chip card.

2. A portable device according to claim 1, wherein the detector enables the detection of the signals sent out by the central processing unit to determine the type of wireless link to be used, in view of the information element corresponding to this type of wireless link, the information element being contained in the chip card.

3. A portable device according to claim 1, wherein the selector enables the commanding of the deactivation of the pack in order to limit its power consumption, and wherein the detector enables the activation of the selector to put the pack back into operation upon the detection of the signal coming from the central processing unit.

4. A portable device according to claim 1, further including one control unit enabling the manual selection of the type of wireless link to be used.

5. A portable device according to claim 1, wherein the selector enables the detection of the presence of the chip card in the pack, in order to permit the working of the pack only if the chip card is present.

6. A portable device according to claim 1, wherein the chip card is incompatible with the second type of wireless communication link, and further comprising a warning device to report the incompatibility between the second type of wireless communication link and the chip card.

7. A portable device according to claim 1, wherein the second application is stored in a different chip card than the first application, and wherein the pack is adapted for receiving both chip cards, the portable device thus being usable with both chip cards.

8. A portable device according to claim 1, further comprising an ultrasonic linking device and a voice-frequency acoustic linking device, and wherein the first wireless linking device is a radioelectric linking device, wherein the second wireless linking device is an infrared linking device, and wherein the selection is also among the ultrasonic linking device and the voice-frequency acoustic linking device.

9. A portable device according to claim 1, wherein the first application is a member of the group consisting of bank card, phone card, security card, toll-gate and cellular phone card, and wherein the second application is a different member of the same group.

10. A portable device according to claim 1, wherein the information element is formed of a cavity formed in the chip card, the configuration of the cavity defining the value of the information element.

11. A portable device for linking at least one chip card to a central processing unit, the at least one chip card having stored therein first, second, third, and fourth application programs, the portable device comprising:

a pack adapted for receiving the at least one chip card;

a chip card communication device disposed between the pack and the at least chip card;

a plurality of wireless linking devices including
      a voice-frequency acoustic linking device, voice-frequency acoustic linking device being used when the first application program is being executed, a radioelectric linking device, the radioelectric linking device being used when the second application program is being executed, an infrared linking device, the infrared linking device being used when the third application program is being executed, and an ultrasonic linking device, the ultrasonic linking device being used when the fourth application program is being executed; and a selector which selects one of the plurality of wireless linking devices as a function of the application program which a user desires to be executed.

12. A portable device according to claim 11, wherein the at least one chip card is only one chip card which stores all four of the first, second, third and fourth application programs.

13. A portable device according to claim 11, wherein the at least one chip card is four separate chip cards, and wherein each of the four separate chip cards stores a different one of the first, second, third and fourth application programs.

14. A portable device according to claim 11, wherein the at least one chip card includes first and second chip cards, and wherein the number of wireless linking devices comprised by the portable device is greater than the number of wireless linking devices by which the first chip card is capable of communicating such that the first chip card is incompatible with at least one of the wireless linking devices, and further comprising a warning device to report the incompatibility when a user attempts to use the first chip card with the at least one incompatible wireless linking device.

15. A portable device according to the claim 11, further comprising a detector defining means for detecting (1) an information element stored in the at least one chip card which indicates the communication link compatibility of the at least one chip card and (2) signals sent out by the central processing unit to the chip card on a wireless link, and means for determining the type of wireless link to be used, based on (1) the information element detected and (2) the wireless link on which the signals are detected.

16. A portable device according to claim 11, wherein the first application program is a member of the group consisting of bank card, phone card, security card, toll-gate and cellular phone card, and wherein the second application program is a different member of the same group.

* * * * *